Feb. 8, 1927.
W. N. HOOKS
PISTON RING REMOVER
Filed March 14, 1925     2 Sheets-Sheet 2
1,616,621
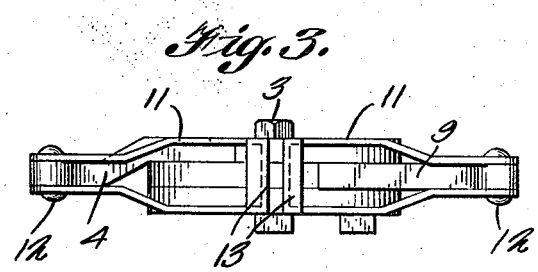
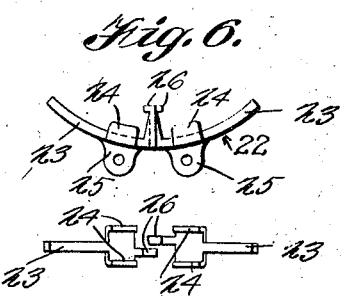
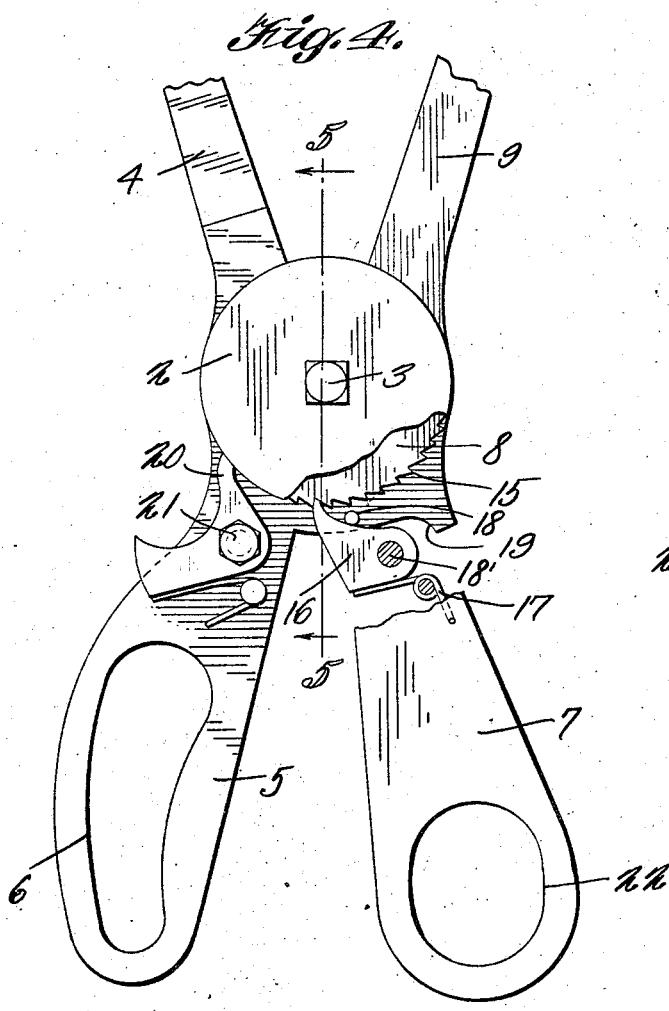
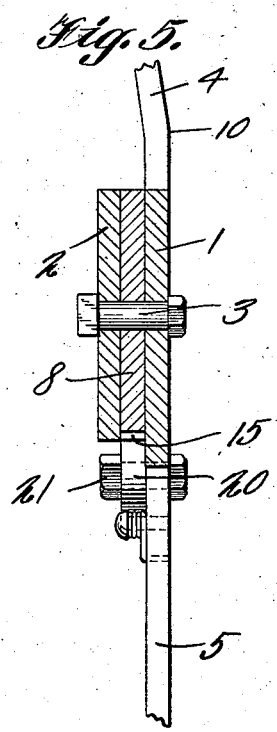
W. N. Hooks, INVENTOR
BY Victor J. Evans ATTORNEY Patented Feb. 8, 1927.

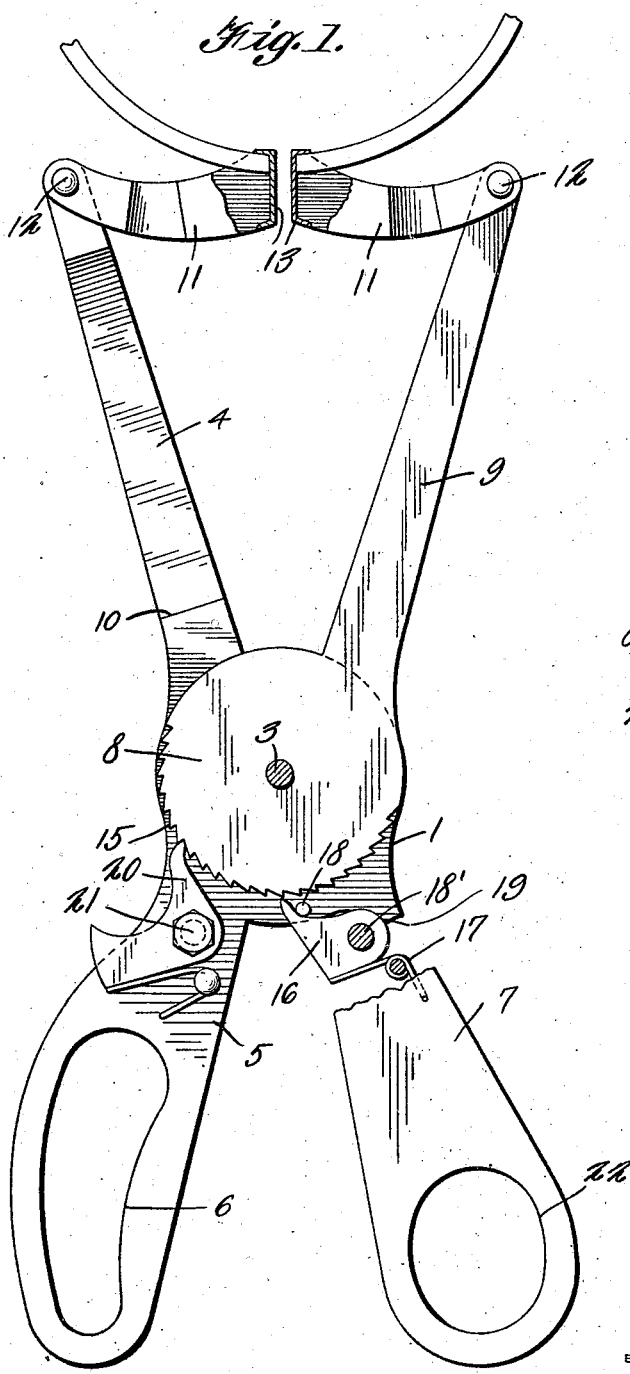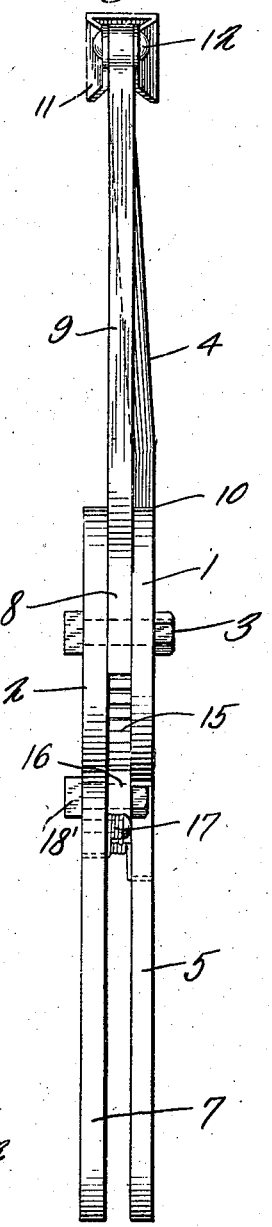

1,616,621

UNITED STATES PATENT OFFICE.

WILLIAM N. HOOKS, OF NORWICH, CONNECTICUT.

PISTON-RING REMOVER.

Application filed March 14, 1925. Serial No. 15,599.

This invention relates to new and useful improvements in ring removers and more particularly to a device which is especially adapted for use in removing piston rings from pistons. The main object of my invention is the provision of a device of the above character wherein the ends of the ring may be engaged in suitable seats provided therefor and the seats moved to spreading position through suitable pawl and ratchet mechanism so that the rings may be quickly and readily detached from the seats.

Another object of my invention is the provision of a piston ring remover wherein the leverage used in spreading the ends of the ring is such that it may be quickly and readily operated by hand through intermittent movement imparted to one of the spreading members and suitable means is provided for retaining the movable arm in spreading position until the ring can be readily removed from the groove in the piston in which it is seated.

With the above and other objects in view, my invention consists in the novel features of construction and the combination and arrangement of parts to be hereinafter more fully described, pointed out in the claims and shown in the accompanying drawings, in which:

Figure 1 is a side elevation illustrating the application of my improved tool, parts thereof being broken away and illustrated in section.

Figure 2 is an edge elevation.

Figure 3 is a top plan view.

Figure 4 is a detail side elevation, parts being broken away and illustrated in section, and Figure 5 is a detail section on the line 5—5 of Figure 4.

Figure 6 is a side elevation of a modified form of clips for engaging the ends of piston rings.

Figure 7 is a top plan view thereof.

In carrying out my invention, I provide two opposed body plates 1 and 2 arranged in opposed relation and pivotally connected by means of the pivot bolt 3.

The plate 1 has extending from one side thereof an arm 4 which projects from the plate at an oblique angle with respect to the transverse axis of the plate, as shown in Figure 1. The plate 1 has also extending therefrom a hand grip 5 provided with a finger loop 6. This hand grip 5 projects from the plate 1 upon the same side of the transverse center as the arm 4 and the arm and hand grip are disposed at oblique angles with respect to each other, as is clearly illustrated in Figure 1.

The plate 2 has a hand grip 7 extending at an angle therefrom and arranged in opposed relation with the hand grip 5, but disposed out of alignment with the hand grip 5 so that in moving the hand grips together they may pass each other if found desirable.

A movable plate 8 is arranged between the plates 1 and 2 pivotally mounted upon the bolt 3. This movable plate has extending therefrom an arm 9 preferably arranged in opposed relation with the arm 4 so that said arms extend in divergent relation with respect to their outer ends and in order to bring the outer ends thereof in parallel alignment, it is necessary to have the arm 4 offset slightly, as shown at 10.

The outer ends of the arms 4 and 9 have pivotally connected thereto the yokes 11, which are U-shaped in cross-section with their ends pivotally connected to the arms by means of the pins 12. The inner ends of the yokes are provided with sockets or seats 13 in which the ends of a piston ring 14 are received, as illustrated in Figure 1. It will be apparent that in positioning the ends of the ring in the seats 13, it will be necessary to use a tool, such as a screw-driver or the like, for removing the ends of the ring from the piston groove and seating them in the sockets 13.

The movable plate 8 is provided upon its periphery with ratchet teeth 15 which extend around a greater portion of the periphery of the plate and adapted to be engaged by actuating pawl 16 which is normally retained in the path of the teeth 15 by means of a spring 17. The plate 1 carries a pin 18 adapted to be engaged by the pawl 16 to limit the inward-swinging movement of the pawl, as shown in Figure 1. From this it will be apparent that upon moving the hand grips 5 and 7 toward each other, the spring pressed pawl 16 will engage the teeth 15 and impart rotative movement to the plate 8 and it will be noted that as the two hand grips 5 and 7 move together, the arms 4 and 9 will have a spreading movement imparted thereto due to the action of the pawl 16 on the plate. The outward-swinging movement of the hand grip 7 with respect to the hand grip 5 is limited by means of the pin 18' upon which the pawl 16 is mounted. This pin engages a stop shoulder 19 formed on the plate 1 and in order to retain the arms in a spreading position, during the time the hand grips 5 and 7 are moved away from each other to again position the pawl 16 for further rotation of the plate 8, a spring-pressed locking pawl 20 is carried by the hand grip 5 and engages the teeth 15 to retain the plate 8 against backward movement and this pawl 20 is pivotally mounted upon a pin 21.

It will be apparent from the foregoing that after the ends of the piston ring have been engaged in the sockets or seats 13, the hand grips 5 and 7 will be in their normal positions, as shown in Figure 1 and by placing the thumb in the loop 22 of the hand grip 7 and certain fingers of the hand in the loop 6, the hand grips may be moved toward each other, the pawl 16 engaging with the teeth 15 to cause the plate to move with the plate 2 in one direction, the plate 1 rotating upon the pivot bolt 3 in the opposite direction. This will impart a spreading movement to the arms 4 and 9 and move the ends of the piston ring away from each other, this operation may be continued until the ring 14 can be quickly and readily removed from the groove of the piston in which it is seated. It will be apparent from the foregoing, that after the hand grips 5 and 7 have been moved toward each other the limit of their movement, the hand grip 7 is moved away from the hand grip 5 carrying the pawl 16 therewith, the same riding over the teeth 15 and this movement is continued until the pin 18 engages the stop shoulder 19 at which time the ratchet 16 will engage the pin 18 and guide the same into engagement with the teeth 15 so that as the hand grips 5 and 7 are moved toward each other in the next operation further spreading movement will be imparted to the arms 4 and 9.

It will be apparent from the foregoing that I have provided a comparatively simple tool, the construction and operation of which is such as to provide a comparatively inexpensive and efficient tool for the purpose described.

In Figures 6 and 7 of the drawings I have illustrated clips provided with the arch-shaped body portions 23 formed with lateral enlargements provided with upstanding lugs 24 adjacent their confronting ends and their lower edges with ears 25. These ears are designed to be pivotally secured to the ends of the arms 4 and 9. The confronting ends of the body portions 23 are formed with rightangularly extended hooks 26, the hook on one of the members being out of alignment with the hook on the other member. The hooks are comparatively thin and are designed to engage the ends of the piston ring, the said ring being cradled on the arched body portions of the clips 22 and being held from lateral movement thereon by the lugs 24. As the hooks 26 pass each other when the clip members 23 are in closed and in contacting relation the said hooks may be readily inserted through the gap provided between the ends of a small piston ring, but the construction may be also employed in connection with large rings as well as with rings for right or left hand angle ends, or that class of ring having its ends either square or stepped.

While I have shown and described the preferred form of my invention, it will be obvious that various changes in the details of construction and in the proportions may be resorted to for successfully carrying my invention into practice without sacrificing any of the novel features or departing from the scope of the appended claims.

Having thus described my invention, what I claim is:—

1. A piston ring spreader including opposed body plates pivotally connected, an arm extending from one of the plates at an angle with respect to the transverse axis of the plate, a movable plate between the opposed plates, an arm extending from the movable plate in opposed relation with the first arm, handle members projecting from the body plates and arranged upon the opposite sides of the body plates from the arms, and means carried by one of the body plates and having cooperative connection with the movable plate to impart movement thereto upon movement of the handle members toward each other.

2. A ring spreader including pivotally connected plates, an arm extending from one of the plates, a movable plate between the body plates, an arm extending from the movable plate in opposed relation with the first arm, handle members carried by the body plates, and means carried by one of the body plates having operative engagement with the movable plate to impart rotative movement thereto upon movement of the handle members toward each other.

3. A piston ring spreader including pivotally connected body plates, an arm extending from one of the plates, a movable plate between the body plates, an arm extending from the movable plate in opposite relation to the first arm, said first arm being offset laterally to position the outer end thereof in alignment with the second arm, yokes pivoted to the outer ends of the arms and having sockets to receive the ends of a ring and manually operated means whereby to move said arms away from each other.

4. A piston ring spreader including pivotally connected body plates, an arm extending from one of said plates, a movable plate between said body plates, an arm carried by the movable plate in opposed relation with the first arm, handle members carried by the body plates, cooperative means between one of said handle members and movable plate to impart movement to said plate upon movement of the handle members toward each other, means carried by the other handle and engaging the movable plate to prevent movement of the same in one direction and means for limiting the swinging movement of one of said handle members in one direction relative to the body plates.

5. A piston ring spreader including pivotally connected body plates, an arm extending from one of the plates, a movable plate between the body plates, an arm extending from the movable plate in opposite relation to the first arm, said first arm being offset laterally to position the outer end thereof in alignment with the second arm, yokes pivoted to the outer ends of the arms and having sockets to receive the ends of a ring, handle members carried by the body plates, means forming operative connection between one of said handle members and the movable plate whereby to impart movement to said plate upon movement of the handle members in one direction and means for limiting the movement of the movable plate in one direction.

In testimony whereof I affix my signature.

WILLIAM N. HOOKS.